(12) United States Patent
Uchida et al.

(10) Patent No.: US 9,122,097 B2
(45) Date of Patent: Sep. 1, 2015

(54) BACKLIGHT SYSTEM AND LCD DEVICE USING THE SAME

(75) Inventors: Tatsuo Uchida, Sendai (JP); Yoshito Suzuki, Sendai (JP); Tohru Kawakami, Sendai (JP); Kazuo Sekiya, Sendai (JP); Masahiro Nishizawa, Sendai (JP); Takahiro Ishinabe, Sendai (JP); Baku Katagiri, Sendai (JP); Katsunori Ehara, Sendai (JP); Yoshihiro Hashimoto, Osaka (JP); Shoichi Ishihara, Osaka (JP); Shuichi Kozaki, Osaka (JP); Yutaka Ishii, Osaka (JP)

(73) Assignees: Sharp Kabushiki Kaisha, Osaka (JP); Tohoku University, Miyagi (JP)

( * ) Notice: Subject to any disclaimer, the term of this patent is extended or adjusted under 35 U.S.C. 154(b) by 418 days.

(21) Appl. No.: 13/643,728

(22) PCT Filed: Dec. 22, 2010

(86) PCT No.: PCT/JP2010/073212
§ 371 (c)(1),
(2), (4) Date: Jan. 11, 2013

(87) PCT Pub. No.: WO2011/135755
PCT Pub. Date: Nov. 3, 2011

(65) Prior Publication Data
US 2013/0201424 A1 Aug. 8, 2013

(30) Foreign Application Priority Data
Apr. 27, 2010 (JP) ................................. 2010-102273

(51) Int. Cl.
G02F 1/1335 (2006.01)
F21V 8/00 (2006.01)

(52) U.S. Cl.
CPC ........ *G02F 1/133606* (2013.01); *G02B 6/0053* (2013.01); *G02B 6/0008* (2013.01);
(Continued)

(58) Field of Classification Search
CPC .......... G02F 1/133603; G02F 1/33606; G02F 2001/133607; G02B 6/0008; G02B 6/0053; G02B 6/0068; G02B 6/0035
USPC ......... 349/62, 68, 95, 96, 112; 362/612, 97.2, 362/97.3; 359/619, 621, 622
See application file for complete search history.

(56) References Cited

U.S. PATENT DOCUMENTS 6,102,545 A 8/2000 Ogino
6,122,465 A 9/2000 Hiyama et al.
(Continued)

FOREIGN PATENT DOCUMENTS

JP 7-253575 A 10/1995
JP 8-152522 A 6/1996
(Continued)

OTHER PUBLICATIONS

Official Communication issued in International Patent Application No. PCT/JP2010/073212, mailed on Mar. 15, 2011.

*Primary Examiner* — Dung Nguyen
*Assistant Examiner* — Tai Duong
(74) *Attorney, Agent, or Firm* — Keating & Bennett, LLP

(57) ABSTRACT

A backlight system (30) includes a light emitting section (31) and an imaging optical system. The imaging optical system includes a first microlens array (MLA1) and a second microlens array (MLA2). The lenses (1A) separates the beams of light emitted from the light emitting section (31) by RGB, and causes them to be converged at a pitch same as a pitch at which the picture elements are arrayed. The lenses (2A) are provided in one-to-one correspondence to the picture elements such that the lenses (2A) have their respective focal points at positions onto which beams of light having passed through the lenses (1A) are converged. The lenses (2A) thus deflect the beams of light which have passed through the lenses (1A) in a substantially vertical direction with respect to the display surface of the liquid crystal panel.

13 Claims, 9 Drawing Sheets

(52) U.S. Cl.
CPC ............ *G02B6/0035* (2013.01); *G02B 6/0068* (2013.01); *G02F 1/133603* (2013.01); *G02F 2001/133607* (2013.01)

(56) References Cited

U.S. PATENT DOCUMENTS

| | | |
|---|---|---|
| 6,144,426 A | 11/2000 | Yamazaki et al. |
| 6,678,023 B1 | 1/2004 | Yamazaki et al. |
| 2005/0041174 A1 | 2/2005 | Numata et al. |
| 2005/0174775 A1 | 8/2005 | Conner |
| 2007/0139582 A1 | 6/2007 | Numata et al. |
| 2012/0043678 A1 | 2/2012 | Numata et al. |
| 2012/0045859 A1 | 2/2012 | Namata et al. |

FOREIGN PATENT DOCUMENTS

| | | |
|---|---|---|
| JP | 8-190080 A | 7/1996 |
| JP | 8-240868 A | 9/1996 |
| JP | 8-286146 A | 11/1996 |
| JP | 9-114023 A | 5/1997 |
| JP | 10-206792 A | 8/1998 |
| JP | 11-183867 A | 7/1999 |
| JP | 11-231316 A | 8/1999 |
| JP | 2000-147500 A | 5/2000 |
| JP | 2002-091385 A | 3/2002 |
| JP | 2005-62692 A | 3/2005 |
| JP | 2006-228576 A | 8/2006 |
| JP | 2007-524975 A | 8/2007 |
| JP | 4055237 B2 | 3/2008 |
| WO | WO 2010/061699 * | 6/2010 |

* cited by examiner $P_1 = n \times P$
$P_2 = \{n/(n+1)\} \times P$
$b = \{(n+1)/n\} \times f$
$a = n \times b$
$(1/a) + (1/b) = 1/f$ L1, L2 : R-LED light sources   M1, M2 : Centers of lenses of MLA1
R1, R2 : Focal points of MLA2 which correspond to R picture elements

BACKLIGHT SYSTEM AND LCD DEVICE USING THE SAME

TECHNICAL FIELD

The present invention relates to backlight systems and liquid crystal display devices which employ such backlight systems and, more particularly, to a backlight system which causes light of different colors to be converged onto the back surfaces of their corresponding picture elements, into which each pixel of a transmissive liquid crystal display element has been divided according to color, and to a liquid crystal display device which carries out a full-color display by using such a backlight system and such a liquid crystal display element.

BACKGROUND ART

Conventionally, a liquid crystal display device which carries out a full-color display achieves a full-color display by (i) dividing each pixel of a transmissive liquid crystal display element into three picture elements, (ii) attaching red (R), green (G), and blue (B) color filters to the respective three picture elements, (iii) irradiating the three picture elements with white light from a backlight, and (iv) controlling, according to a signal representing a voltage applied to a liquid crystal cell of each picture element, the transmittance of the white light passing through that picture element.

However, since each of the R, G, and B color filters transmits light of wavelengths in its corresponding wavelength range and absorbs light of wavelengths in the other wavelength ranges, such a liquid crystal display device which uses color filters loses approximately ⅔ of the light. This causes efficiency in the utilization of light to be low.

In order to address such a problem, there has been proposed a technique that achieves improvement of efficiency in the utilization of light as disclosed in, for example, Patent Literature 1. FIG. 12 is a cross-sectional view schematically illustrating a configuration of an image display device disclosed in Patent Literature 1. The image display device 21 includes a backlight source 2, a diffraction grating 3, a first microlens array 4, a liquid crystal panel 5, a second microlens array 22, and a diffusion plate 6, which are arranged in this order. The backlight source 2 emits beams of white light W, the beams being substantially parallel to each other. The parallel beams are slightly inclined at an angle to a light-exit surface 12 of a light guide plate 7. The parallel beams, which have entered the diffraction grating 3, are diffracted by the diffraction grating 3. Of the beams of light diffracted by the diffraction grating 3, a first order diffracted beam exits the diffraction grating 3 in a direction substantially vertical to the diffraction grating 3. Note here that, since beams of light of different wavelengths have different angles of diffraction, the first order diffracted beam is separated by color, i.e., into red light R, green light G, and blue light B.

The first microlens array 4 is arranged such that each microlens 4a corresponds to a group of pixels 14, that is, three adjacent pixels of the liquid crystal panel 5. Therefore, the microlenses 4a cause the red light R, the green light G and the blue light B, which have exited from the diffraction grating 3 such that their optical axes are in different directions, to be converged onto respective different pixels 14 of a single group. It is thus possible to cause the red light R, the green light G, and the blue light B to be transmitted or blocked, independently, by controlling each of the pixels 14 to be turned ON/OFF. This allows the image display device 21 to carry out a color display.

Further, the second microlens array 22 is arranged such that microlenses 22a correspond to the respective microlenses 4a of the first microlens array 4, and that a distance L from a main plane of the first microlens array 4 to a main plane of the second microlens array 22 is equal to a distance from the focal point of the first microlens array 4 to the focal point of the second microlens array 22. Therefore, although the red light R, green light G and blue light B have respective optical axes different in direction from one another when they have passed through the pixels 14 of the liquid crystal panel 5, the red light R, green light G and blue light B will have their optical axes aligned in parallel to each other by passing through the microlens 22a of the second microlens array 22.

In this circumstance, the red light R, green light G and blue light B which have passed through the second microlens array 22 are diffused by the diffusion plate 6. As illustrated in FIG. 12, the diffused beams of light have respective directivity properties $T_R$, $T_G$, and $T_B$ which are equal to each other. This allows prevention of a color shift which can be recognized by a viewer who views the image display device 21 from different directions. It is thus possible to improve efficiency in the utilization of light and viewing angle characteristics of the image display device 21.

CITATION LIST

Patent Literature

Patent Literature 1
Japanese Patent Publication No, 4055237 (Registration Date: Dec. 21, 2007)

SUMMARY OF INVENTION

Technical Problem

Although the image display device 21 of Patent Literature 1 enables red light R, green light G, and blue light B to have their optical axes aligned in parallel to each other by causing the light to pass through the microlens 22a of a second microlens array 22, the image display device 21 cannot align, for each colored light, light beams other than the optical axis in parallel to each other. Therefore, light beams other than the optical axis of each colored light still have different directivity properties of different angles. This causes a color shift. Further, beams of colored light, when they reach a diffusion layer, will overlap each other in a horizontal direction. This causes a lowering of a sense of resolution of a display screen recognized by a viewer who views the display screen. The image display device 21 of Patent Literature 1, therefore, cannot achieve a sufficient improvement in viewing angle characteristics and a sense of resolution.

The present invention has been accomplished in view of the problems, and an object of the present invention is to provide a backlight system which can enhance display quality by achieving a high level of efficiency in the utilization of light and further improvements in viewing angle characteristics and a sense of resolution.

Solution to Problem

In order to attain the above object, a backlight system in accordance with the present invention is a backlight system including: a light-emitting section for emitting beams of light at different dominant wavelengths from one another; and an imaging optical system for causing the beams of light emitted from the light emitting section to be converged, said backlight system irradiating a liquid crystal panel with the beams of light, which have passed through the imaging optical system, the liquid crystal panel including a plurality of pixels arrayed at a predetermined pitch, each of the pixels being configured to include a plurality of picture elements corresponding to respective colors, the imaging optical system including a first lens array and a second lens array, wherein the first lens array is an array of first lenses arrayed at a predetermined pitch and the second lens array is an array of second lenses arrayed at a predetermined pitch, the first lenses (i) separating, by color, the beams of light emitted from the light emitting section, and (ii) causing the separated beams of light to be converged at a pitch same as a pitch at which the picture elements are arrayed, the second lenses being (i) provided in one-to-one correspondence to the picture elements, and (ii) arranged such that the second lenses have their respective focal points at positions onto which the beams of light which have passed through the first lenses are converged, the second lenses deflecting the beams of light, which have passed through the first lenses, in a substantially vertical direction with respect to the display surface of the liquid crystal panel so that the liquid crystal panel is irradiated with the deflected light.

According to the configuration, the beams of light, which have (i) been emitted by the light emitting section constituted by, for example, RGM light sources (LED), and (ii) passed through the second lens array, are converted into beams of light in a substantially vertical direction with respect to the display surface of the liquid crystal panel, that is, beams of light whose directions are substantially parallel to each other (parallel beams), at spatially different positions from each other, so as to illuminate the liquid crystal panel. The lenses of the second lens array are provided in one-to-one correspondence to respective RGB picture elements of the liquid crystal panel, so that the RGB picture elements can be irradiated with the beams of light emitted from the respective RGB light sources.

This makes it possible to carry out a full-color display without using color filters, and achieve an improvement in efficiency in the utilization of light by an amount corresponding to the amount otherwise absorbed by the color filters. Since the liquid crystal panel is irradiated with substantially parallel beams of light, it is possible to achieve (i) a reduction in a ratio of light to be shielded by BM (black matrix) between the picture elements, and (ii) an improvement in efficiency in the utilization of light by an amount corresponding to the amount thus reduced. Further, since the liquid crystal panel is irradiated with substantially parallel beams of light obtained by passing through the second lens array, it is possible to achieve a further improvement in a sense of resolution of the liquid crystal panel.

Furthermore, since the substantially parallel beams of light, which are obtained by passing through the second lens array, pass through the liquid crystal panel and then reach a diffusion plate so as to be diffused by the diffusion plate, the diffused R, G and B light beams have the same angular distribution. This prevents a viewer who views a liquid crystal display device from different directions from recognizing different colors depending on the directions. This allows improvements in viewing angle characteristics and color reproducibility to be achieved. Even in a case where the light emitting section employs light sources having significant individual differences such as LEDs, it is possible to reduce luminance unevenness and color unevenness by averaging variations in the individual-differences among light emitted from the light sources.

The backlight system can be configured such that on the assumption that the pitch at which the pixels are arrayed is denoted as P and the imaging optical system has an imaging magnification of (1/n), the light emitting section has a pitch $P_1$ given as $P_1 = n \times P$, and the first lenses are arrayed at a pitch $P_2$ given as $P_2 = (n/(n+1)) \times P$.

According to the configuration, images formed by beams of light emitted from a plurality of light sources corresponding to respective colors of the picture elements overlap each other at the focal points of the second lens array. This eliminates boundaries between areas, and allows spatial uniformization to be achieved. It is therefore possible to effectively reduce luminance unevenness and color unevenness between areas within the display screen. This allows a higher-quality display to be carried out (see FIG. 2).

The backlight system can be configured such that the imaging optical system includes a Fresnel lens.

Assume that, in the configuration, (i) the Fresnel lens is provided between the light emitting section and the first lens array, (ii) a G light source is provided at the focal point of the Fresnel lens, and (iii) a B light source and an R light source are arranged at both sides of the G light source. In such a case, beams of light, which have (i) been emitted from the G light source and (ii) passed through the Fresnel lens, are deflected so as to be parallel beams of light since the G light source is located at the focal point of the Fresnel lens. On the other hand, beams of light, which have (i) been emitted from the respective R and the B light sources and (ii) passed through the Fresnel lens, are deflected substantially parallel and at angles which are different from each other and different from that of the parallel beams of light emitted from the G light source. The beams of light emitted from the respective R, G and B light sources form images at substantially the respective focal points of the second lens array, which focal points correspond to the respective colors R, G and B of picture elements. Accordingly, beams of light, which have passed through the second lens array and thus have an increased degree of parallelization, irradiate the liquid crystal panel. This allows a further improvement in a sense of resolution.

The backlight system can be configured such that the first and the second lens arrays of the imaging optical system are arrays of lenses each of which deflects an optical path by way of (i) a surface shape of the lens or (ii) a refractive index distribution within the lens.

Note that in a case where an optical path is deflected by way of a surface shape of a lens, the optical path is deflected according to the Snell's law by using a difference in refractive index at the interface on the lens surface. On the other hand, in a case where an optical path is deflected by a refractive index distribution, the light is deflected by distributing refractive indices within the lens. This means to give a gradient to refractive indices inside of the lens by causing refractive indices to change them from the center to the periphery of the lens so that light is deflected due to the gradient of refractive index. In a case where an optical path is deflected by a refractive index distribution, the lens surface is even. Therefore, a polarizer or an optical film etc. can be directly adhered to the lens array. This makes it easy to maintain spaces between the polarizer or optical film etc. and the lens array.

The backlight system can be configured such that the first and the second lens arrays of the imaging optical system include (i) fly-eye lenses, (ii) lenticular lenses, or (iii) a fly-eye lens and a lenticular lens.

Specifically, the first and the second lens arrays can include, for example, (i) fly-eye lenses in each of which microlenses are arranged in two directions which are orthogonal to each other, (ii) lenticular lenses in each of which micro cylindrical lenses are arranged in a direction perpendicular to their longitudinal direction, or (iii) a fly-eye lens and a lenticular lens.

In a case where the first and the second lens arrays are constituted by a plurality of lens arrays, it is possible to reduce the curvature of a surface shape as compared with a case where they are constituted by a single lens array. This allows generation of stray light to be suppressed.

The backlight system can be configured such that the light emitting section is made up of (i) any one type of a LED light source, a laser light source, and an organic EL light source or (ii) a light emitting device including the light source and a light guide.

The backlight system can be configured such that the light emitting section and the imaging optical system are divided into a plurality of blocks; and a light source included in the light emitting section has its optical axis rotated so that beams of light emitted from each of the blocks of the light emitting section substantially equally enter said each of the blocks of the imaging optical system.

According to the configuration, for example in a case of displaying an image in which there is a great difference in luminance between a considerably wide region and the other region within the entire screen, the division of the entire screen into a plurality of blocks makes it easier to control luminance and color.

A composite backlight system in accordance with the present invention includes a plurality of backlight units arranged in parallel with each other, each of the plurality of backlight units being a backlight system mentioned above.

As an area irradiated by a single backlight system is increased, the thickness from the light emitting section to the first lens array is increased proportionally. According to the configuration, a plurality of backlight units are arranged in parallel with each other, each of the plurality of backlight units being a single backlight system. This allows the thickness of the backlight system to be reduced by (i) decreasing an area irradiated by a single backlight system, and (ii) irradiating a single liquid crystal panel by a plurality of backlight systems.

The composite backlight system can be configured to further include means for controlling an amount of light of the light emitting section for each of or for every two or more of the plurality of backlight units.

The configuration makes it possible, for example in a case of displaying an image of the moon in the night sky (i.e., part of the image is bright and the other part is dark), to bring about a great contribution to lowering electric power consumption by reducing the amount of light of the backlight unit which corresponds to the darker part.

The composite backlight system can be configured such that at least one type of the imaging optical systems of the plurality of backlight units is an integrated component corresponding to two or more of the plurality of backlight units.

This makes it possible to reduce manufacturing costs and to dispense with an alignment step.

A liquid crystal display device in accordance with the present invention includes a backlight system mentioned above or a composite backlight system mentioned above, the liquid crystal display device including: a liquid crystal element including a liquid crystal layer and entrance-side and exit-side glass substrates disposed on light entrance and exit sides, respectively, so that the liquid crystal layer is sandwiched therebetween; a drive element, which drives the liquid crystal element; a polarizer disposed on the entrance-side glass substrate of the liquid crystal element; an analyzer disposed on the exit-side glass substrate of the liquid crystal element; and a diffusion element disposed on an exit surface of the analyzer, the liquid crystal element, the drive element, the polarizer, the analyzer, and the diffusion element being disposed on a light exit side of the second lens array.

According to the configuration, the liquid crystal display device includes the above-mentioned backlight system. This allows the liquid crystal display device to achieve improvements in viewing angle characteristics and a sense of resolution while achieving a high level of efficiency in the utilization of light. This enhances display quality of the liquid crystal display device.

According to the liquid crystal display device, a diffusion element is disposed specifically on an exit surface of the analyzer. This prevents occurrence of a problem (i) that a viewer recognizes with difficulty what is displayed on a screen of the liquid crystal display device from an oblique direction due to shortage of light or (ii) that a viewer cannot at all recognize what is displayed on a screen of the liquid crystal display device from an oblique direction due to lack of light.

The liquid crystal display device can be configured such that the liquid crystal layer, the polarizer, and the entrance-side glass substrate are stacked in this order from the liquid crystal layer toward a light entrance side.

By providing the polarizer between the liquid crystal layer and the entrance-side glass substrate, it is possible to form the second lens array of the imaging optical system directly on the entrance-side glass substrate. This allows alignment between the second lens array and the liquid crystal layer to be maintained highly precisely. It is further possible, by providing the polarizer between the entrance-side glass substrate and the liquid crystal layer, to cause light converged on the imaging optical system to pass through the liquid crystal layer while maintaining a high polarization property. This effectively prevents deterioration in display quality.

The liquid crystal display device can be configured such that the liquid crystal layer, the drive element, the analyzer, the exit-side glass substrate, and the diffusion element are stacked in this order from the liquid crystal layer toward the light exit side.

By providing the analyzer between the exit-side glass substrate and the liquid crystal layer, it is possible to cause the analyzer to be contained in the liquid crystal panel while the liquid crystal panel is produced. This makes it possible to omit a combining step for combining the liquid crystal panel with the analyzer.

The liquid crystal display device can be configured such that the liquid crystal layer, the drive element, the analyzer, the diffusion element, and the exit-side glass substrate are stacked in this order from the liquid crystal layer toward the light exit side.

Assume that for example the exit-side glass substrate exists between the liquid crystal layer and the analyzer. When beams of light which have passed through adjacent picture elements reach the analyzer, the beams of light may overlap each other depending on the thickness of the glass substrate. Such beams of light overlapping each other may be diffused by the diffusion plate and cause deterioration in display quality.

In this regard, according to the configuration, the liquid crystal layer, the driving element, the analyzer, the diffusion plate, and the exit-side glass substrate are stacked in this order from the liquid crystal layer toward the exit side. This allows prevention of such deterioration in display quality.

The liquid crystal display device can be configured to further include a polarization-holding diffusion element provided between the drive element and the exit-side glass substrate.

The liquid crystal display device can be configured such that the liquid crystal layer, the drive element, the polarization-holding diffusion element, the analyzer, and the exit-side glass substrate are stacked in this order from the liquid crystal layer toward the light exit side.

The liquid crystal display device can be configured such that the liquid crystal layer, the drive element, the exit-side glass substrate, the polarization-holding diffusion element, and the analyzer are stacked in this order from the liquid crystal layer toward the light exit side.

The liquid crystal display device can be configured such that the diffusion element further has an incidence-angle-independent diffusion characteristic.

According to the configuration, the diffusion element has an incidence-angle-independent diffusion characteristic (a characteristic in which diffusion intensity distributions when light is transmitted through a diffusion plate are constant independently of an incidence angle of the light entering into the diffusion plate). This causes beams of light, which have passed through the picture elements into which a pixel is divided spatially by color, to have the same diffusion characteristic. An improvement in display quality can thus be achieved.

The liquid crystal display device can be configured to further include a color filter layer provided on an entrance surface of the exit-side glass substrate.

In general, a liquid crystal display device is produced by producing optical components to be used and then assembling the optical components. However, there can be problems that, due to variations in manufacturing, for example (i) optical components cannot be manufactured as designed, and thus cannot be assembled, and (ii) there is no choice but to produce optical components somewhat different from designed ones in view of manufacturing cost. In such circumstances, it may be difficult to cause only corresponding beam of light to be converged onto the picture elements of the liquid crystal layer. This may cause deterioration in display quality.

In this regard, according to the configuration, the color filter layer is provided on an entrance surface of the exit-side glass substrate. This allows prevention of such deterioration in display quality.

The liquid crystal display device can be configured such that the polarizer is provided between the first lens array and the second lens array.

According to the configuration, the second lens array can be produced in a liquid crystal element manufacturing process which includes an alignment step for aligning the second lens array with the liquid crystal element. It is thus possible to dispense with an alignment step for aligning the second lens array with the manufactured liquid crystal display device (liquid crystal panel), the alignment step being required in a case where the imaging optical system is manufactured separately from the liquid crystal element. Further, since the first lens array can be formed directly on a protection film of the polarizer, it is possible to reduce the number of the optical components.

The liquid crystal display device can be configured such that the liquid crystal element and the drive element have their places swapped.

Advantageous Effects of Invention

As has been described, a backlight system of the present invention is configured such that the imaging optical system including a first lens array and a second lens array, wherein the first lens array is an array of first lenses arrayed at a predetermined pitch and the second lens array is an array of second lenses arrayed at a predetermined pitch, the first lenses (i) separating, by color, the beams of light emitted from the light emitting section, and (ii) causing the separated beams of light to be converged at a pitch same as a pitch at which the picture elements are arrayed, the second lenses being (i) provided in one-to-one correspondence to the picture elements, and (ii) arranged such that the second lenses have their respective focal points at positions onto which the beams of light which have passed through the first lenses are converged, the second lenses deflecting the beams of light, which have passed through the first lenses, in a substantially vertical direction with respect to the display surface of the liquid crystal panel so that the liquid crystal panel is irradiated with the deflected light.

This enhances display quality by achieving a high level of efficiency in the utilization of light and further improvements in viewing angle characteristics and a sense of resolution.

DESCRIPTION OF EMBODIMENTS

The following description will discuss embodiments of the present invention with reference to drawings. Note, however, that the present invention is not limited to the embodiments.

Embodiment 1

Figure 1:
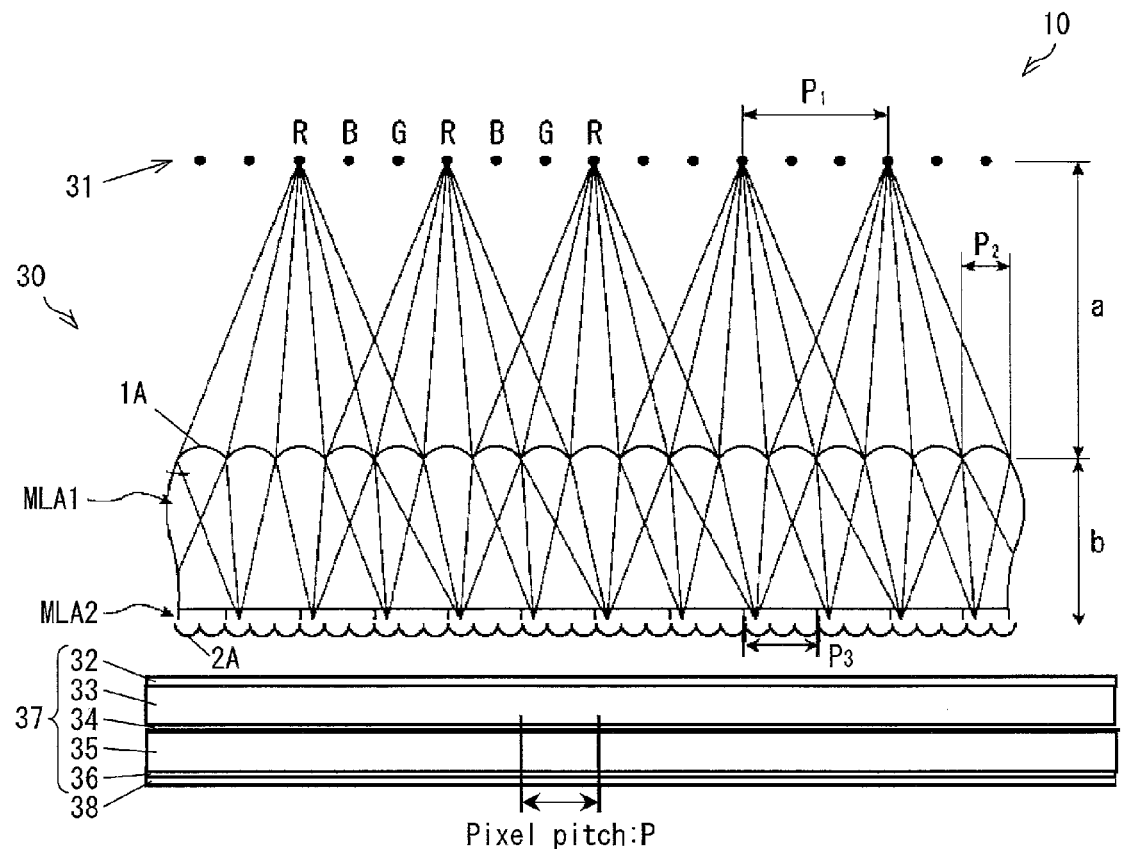
FIG. 1 is a cross-sectional view schematically illustrating a configuration of a liquid crystal display device in accordance with Embodiment 1.

FIG. 1 is a cross-sectional view schematically illustrating a configuration of a liquid crystal display device in accordance with Embodiment 1. The liquid crystal display device includes a liquid crystal panel and a backlight system. The backlight system includes: a light emitting section for emitting beams of light at different dominant wavelengths from one another; and an imaging optical system for causing the beams of light emitted from the light emitting section to be converged. The backlight system irradiates the liquid crystal panel with beams of light, which have passed through the imaging optical system.

The following description will address a specific configuration of the liquid crystal display device. As illustrated in FIG. 1, the liquid crystal display device 10 has a configuration in which a light emitting section 31; a first microlens array (MLA1) ("microlens array" is hereinafter referred to as "MLA", if necessary) which corresponds to a first lens array of the present invention; a second microlens array (MLA2) which corresponds to a second lens array of the present invention; a liquid crystal panel 37 constituted by a polarizer 32, a glass substrate 33 provided on the light entrance side (hereinafter referred to as "entrance-side glass substrate"), a TFT driving section (driving element) (not illustrated), a liquid crystal layer 34, a glass substrate 35 provided on the light exit side (hereinafter referred to as "exit-side glass substrate"), and an analyzer 36; and a diffusion plate 38 (diffusion element) are stacked in this order.

The light emitting section 31 is constituted by a plurality of light sources, such as LED (Light emitting diode) light sources, that emit beams of light at different dominant wavelengths from one another. In FIG. 1, an R (red)-LED light source (R light source), a G (green)-LED light source (G light source), and a B (blue)-LED light source (B light source) are arranged in this order from the right side to the left side of FIG. 1. Note that the number of colors of the light sources can be four or more, and the order of the light sources are not limited to the order of RGB.

The MLA1 is configured such that a plurality of lenses 1A (which correspond to the first microlenses of the present invention) of the same shape are arrayed at a predetermined pitch, the lenses 1A being provided so as to face the liquid crystal panel 37 at a predetermined distance. The lenses 1A are arrayed at a pitch (later described in detail) substantially the same as a pitch at which pixels of the liquid crystal panel 37 are arrayed. Each of the pixels is constituted by three picture elements (an R picture element, a G picture element, and a B picture element) which correspond to respective colors (R (red), G (green), and B (blue)).

In the circumstances, when attention is directed to a single lens 1A of the MLA1, beams of light emitted from the respective RGB light sources enter the lens 1A such that their chief rays are at different angles. The respective beams of light having entered the lens 1A such that their chief rays are at different angles are converged on spatially different positions from one another. Therefore, the beams of light emitted from the RGB light sources pass through the lens 1A and are then converged on spatially different positions from one another.

The MLA2 is configured such that a plurality of lenses 2A (which correspond to the second microlenses of the present invention) of the same shape are arrayed at a predetermined pitch, the lenses lens 2A being provided between the MLA1 and the liquid crystal panel 37 so as to face the liquid crystal panel 37 at a predetermined distance. The lenses 2A are provided in one-to-one correspondence to the picture elements such that the lenses 2A have their respective focal points at positions onto which beams of light which have passed through the lenses 1A are converged.

Note here that the basic principle of a lens is such that beams of light having passed through the focal point of a lens and then passed through a lens surface are converted so as to be parallel to each other. Therefore, the beams of light having passed through the lenses 2A of the MLA2 are converted into parallel beams of light. However, since the beams of light are in fact emitted from light sources which are not ideal point light sources but finite objects, the beams of light, which have passed through the MLA1, are not converged only onto a single focal point of the MLA2 but converged to form a point image having a certain area. Therefore, the beams of light obtained by passing through the MLA2 are substantially parallel beams.

Further, since the lenses 2A of the MLA2 are arrayed at the same pitch as a pitch at which the RGB picture elements of the liquid crystal panel 37 are arrayed, the respective RGB parallel beams of light converted at the MLA2 will pass through the RGB picture elements of the liquid crystal panel 37 which correspond to the respective colors. That is, R light passes through the R picture element, G light passes through the G picture element, and B light passes through the B picture element. It is thus possible to cause the RGB light to be transmitted or blocked, independently, by controlling each of the picture elements to be turned ON/OFF. This makes it possible to carry out a color display without using color filters.

Further, since the beams of RGB light are converted into the substantially parallel beams of light by the MLA2, the beams of light are diffused by the diffusion plate so as to have substantially the same angular characteristic. This prevents a viewer who views the liquid crystal display device from different directions from recognizing different colors depending on the directions. This allows an improvement in color reproducibility to be achieved. Furthermore, the substantially parallel beams of RGB light can be prevented as much as possible, when they reach the diffusion plate, from overlapping each other in the horizontal direction. This allows a viewer who views the liquid crystal display device to attain an improved sense of resolution.

Note that actual light sources have significant variations of individual-difference resulting from a manufacturing process. This causes deterioration in display quality resulting from luminance unevenness or color unevenness. In this regard, according to Embodiment 1, as described above, beams of light emitted from a plurality of light sources of the same color are converged by the MLA1 onto respective focal points of the MLA2, and the liquid crystal panel 37 is irradiated with the substantially parallel beams of light (which are substantially vertical to a display surface of the liquid crystal panel 37). It is thus possible to achieve (i) uniformization of viewing angle characteristics of respective colors and (ii) an improvement in a sense of resolution. It is also possible to reduce luminance unevenness and color unevenness by averaging variations in the individual-differences among light emitted from the light sources. This allows a liquid crystal display device which has a higher realizability to be provided.

The following description will discuss, with reference to FIG. 1, a specific configuration for averaging variations in the individual-differences among light from the light sources. As illustrated in FIG. 1, it is assumed that (i) lenses 1A of the MLA1 have a reduction ratio (1/n) given as n=a/b, where a is a distance from the light emitting section 31 (LED light source array) to the MLA1, and b is a distance from the MLA1 to the MLA2, (ii) the light sources of the same color of the light source array are arranged at a pitch $P_1$ given as $P_1=n\times P$, (iii) the lenses 1A of the MLA1 are arrayed at a pitch $P_2$ given as $P_2=(n/(n+1))\times P$, and (iv) the lenses 2A of the MLA2 which correspond to the same color are arrayed at a pitch $P_3$ given as $P_3=P$, where P is a pitch at which pixels of the liquid crystal panel 37 are arranged.

Figure 2:
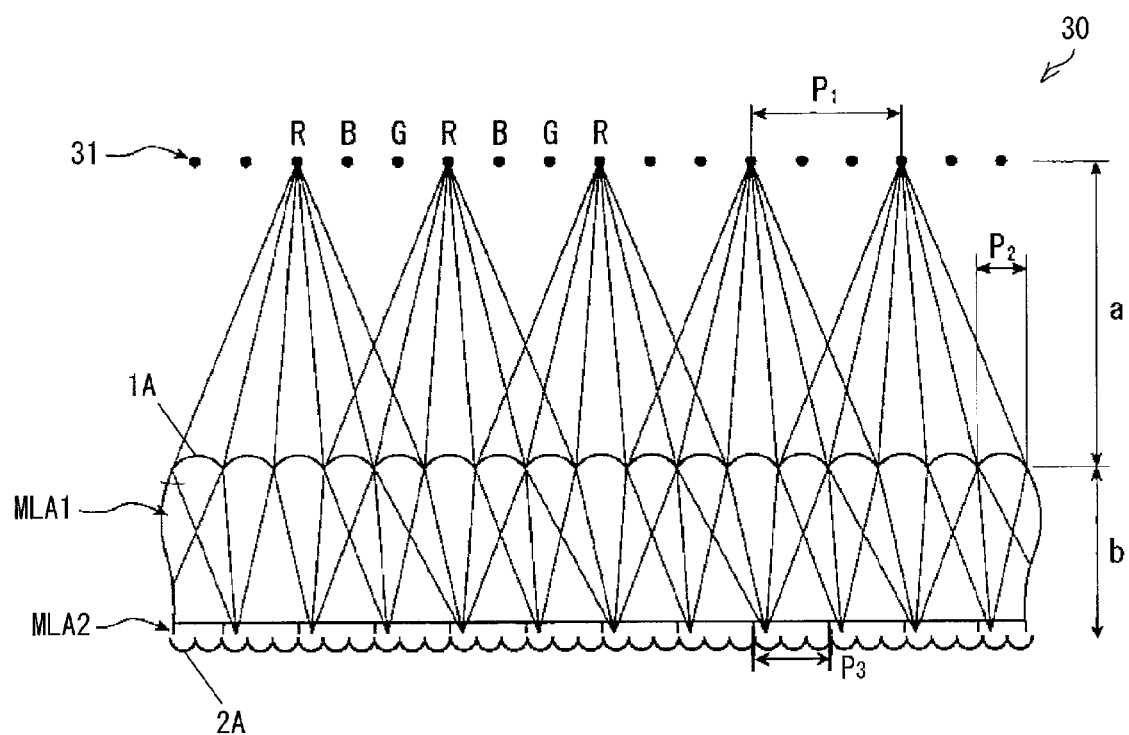
FIG. 2 is a cross-sectional view schematically illustrating a configuration of a backlight system in accordance with Embodiment 1.

FIG. 2 is a cross-sectional view schematically illustrating a configuration of a backlight system 30 of Embodiment 1. The light emitting section 31, as described above, employs an R light source, a G light source, and a B light source as a plurality of light sources that emit light of different colors from one another. The RGB light sources are arranged in this order from the right side to the left side of FIG. 2. In the light emitting section 31, an MLA1 which has an imaging magnification of (1/n) is used as an imaging optical system. The light sources of the same color of the light source array are arranged at a pitch $P_1$ given as $P_1=n\times P$, and the lenses 1A of the MLA1 are arrayed at a pitch $P_2$ given as $P_2=(n/(n+1))\times P$.

Therefore, it is possible to cause the light from the respective RGB light sources to be converged on their corresponding focal points of the MLA2, by configuring the backlight system 30 such that (i) a distance b from the MLA1 to the MLA2 depending on a focal length f of the MLA1 is denoted as $b=((n+1)/n)\times f$, and (ii) the length a of the path of a chief ray from the light source 1 to the MLA1 is denoted as $a=n\times b$ (see FIG. 2).

According to the configuration, as illustrated in FIG. 2, images formed by beams of light from a plurality of light sources corresponding to respective colors of picture elements overlap each other at the focal points of respective lenses. This eliminates boundaries between areas, and allows spatial uniformization to be achieved. It is therefore possible to effectively reduce luminance unevenness and color unevenness between areas within the display screen. This allows a higher-quality display to be carried out.

Note that FIG. 2 illustrates only the paths of beams of light (R light) from the R light sources to the R picture elements and omits to illustrate the paths of G light or B light.

Figure 3:
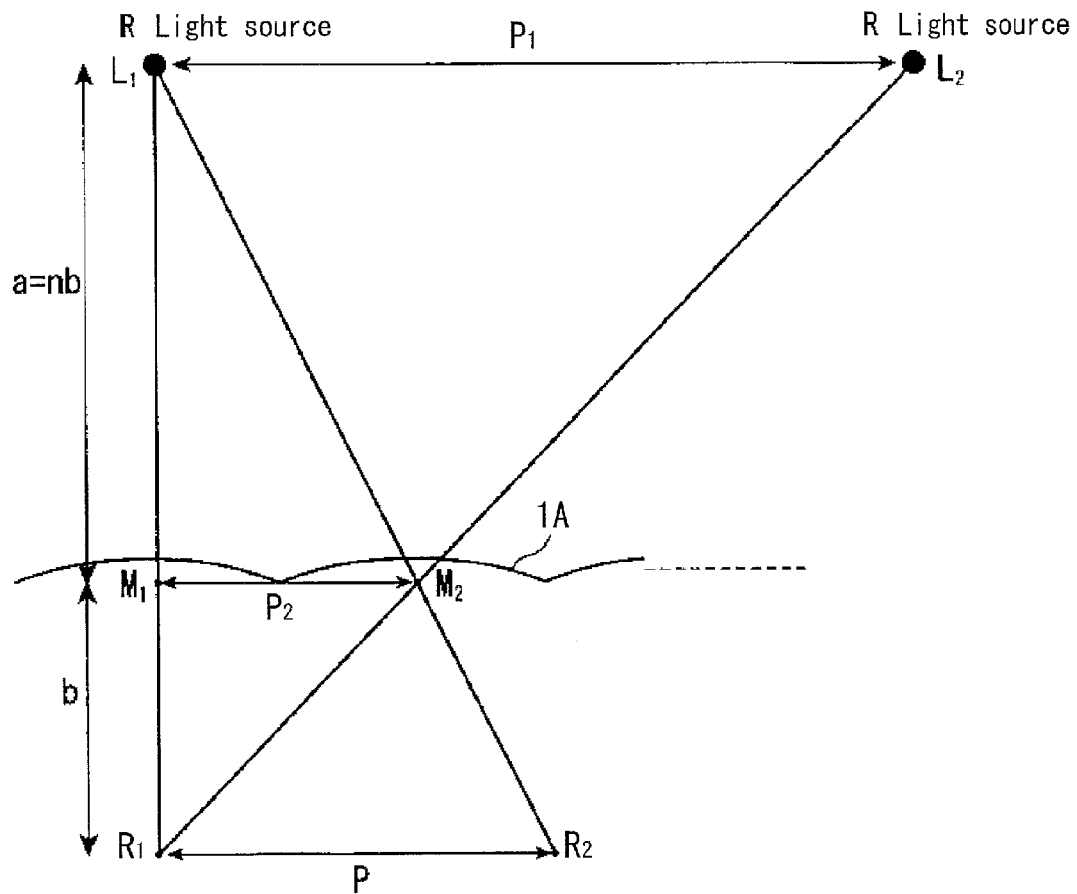
FIG. 3 illustrates relative positions of an MLA1 and an MLA2 in accordance with the present invention.

The following description will mathematically explain, with reference to FIG. 3, the principle of an optical system that (i) causes beams of light from the R, G, and B light sources to be converged onto the respective focal points of the MLA2 and also (ii) causes beams of light from a plurality of light sources of the same color to overlap a single focal point of the MLA2. Note that FIG. 3 illustrates only the paths of chief rays passing through the center of the MLA1, of the beams of light (R light) emitted from the R light source to the MLA2 corresponding to the R picture elements, and omits to illustrate the path of G light or B light. FIG. 3 also omits a refraction that occurs at the interface of the MLA due to a difference in refractive index.

It is assumed in FIG. 3 that (i) $L_1$ and $L_2$ denote the positions of two R light sources adjacent to each other, (ii) $M_1$ and $M_2$ denote the centers of lenses of the MLA1, and (iii) $R_1$ and $R_2$ denote focal points of the MLA2 which correspond to two R light sources adjacent to each other.

First, in order for a beam of light from a single R light source to be converged onto the focal points $R_1$ and $R_2$ of the MLA2 which correspond to the respective R picture elements, it is necessary that the triangle $L_1R_1R_2$ and the triangle $L_1M_1M_2$ are similar to each other (see FIG. 3). For the satisfaction of this relationship, the following equation has to be satisfied:

$$\text{Line } M_1M_2/\text{Line } L_1M_1=\text{Line } R_1R_2/\text{Line } L_1R_1.$$

The pitch $P_2$ at which the lenses of the MLA1 are arrayed corresponds to the line $M_1M_2$ and therefore is derived from the following relational expression based on the above equation:

$$\text{Line } M_1M_2=\text{Line } L_1M_1\times\text{Line } R_1R_2/\text{Line } L_1R_1,$$

where Line $L_1M_1$ is denoted as $a=n\times b$, Line $R_1R_2$ is P, and Line $L_1R_1$ is denoted as $a+b=(n+1)\times b$. Therefore, the line $M_1M_2$ is calculated as $M_1M_2=n\times P/(n+1)$. Accordingly, in a case where the line $M_1M_2$, which is the lens pitch $P_2$ of the MLA1, is $n\times P/(n+1)$, a beam of light from a single R light source can be converged onto the focal points of the MLA2 which correspond to the respective R picture elements.

Next, in order for beams of light from a plurality of light sources of the same color (here, beams of light from the two R light sources) to be converged onto the focal point of the MLA2 which corresponds to a single R picture element, it is necessary that the triangle $L_1L_2R_1$ and the triangle $M_1M_2R_1$ are similar to each other (see FIG. 3). For the satisfaction of this relationship, the following equation has to be satisfied:

$$\text{Line } L_1L_2/\text{Line } L_1R_1=\text{Line } M_1M_2/\text{Line } M_1R_1.$$

The pitch $P_1$ between light sources of the same color of the light source array corresponds to the line $L_1L_2$ and therefore is derived from the following relational expression based on the above equation:

$$\text{Line } L_1L_2=\text{Line } L_1R_1\times\text{Line } M_1M_2/\text{Line } M_1R_1,$$

where Line $L_1R_1$ is denoted as $a+b=(n\times 1)\times b$ and Line $M_1R_1$ is b. By applying the relationship "Line $M_1M_2=n\times P/(n+1)$" derived above, therefore, the line $L_1L_2$ is calculated as $L_1L_2=n\times P$. Accordingly, in a case where the line $L_1L_2$, which is the pitch $P_1$ between the light sources of the same color, is $n\times P$, beams of light from a plurality of light sources of the same color (here, beams of light from the two R light sources) can be converged onto the focal point of the MLA2 which corresponds to a single R picture element.

These two results show that by configuring the backlight system 30 such that (i) the pitch $P_1$ between light sources of the same color is denoted as $P_1=n\times P$ and (ii) the pitch $P_2$ at which the lenses of the MLA1 are arrayed is denoted as $P_2=n\times P/(n+1)$, a beam of light from a single R light source can be converged onto the focal points of the MLA2 which correspond to respective R picture elements, and simultaneously beams of light from a plurality of R light sources can be converged onto a focal point of the MLA2 which corresponds to a single R picture element while overlapping each other. The same applies to a case where R is replaced by G or B. Further, the same results can be obtained in a case where, in the above calculation, the pitch P at which pixels of the liquid crystal panel are arrayed is replaced with the pitch $P_3$ at which the lenses corresponding to the same color of the MLA2 are arrayed, because P equals to $P_3$.

According to the liquid crystal display device of Embodiment 1, beams of light emitted from the respective RGB light sources (LED) will pass through the MLA2 and then be converted into substantially parallel beams of light (which are substantially vertical to the display surface of the liquid crystal panel 37) at spatially different positions from one another, so as to illuminate the liquid crystal panel. Further, by providing the lenses of the MLA2 in one-to-one correspondence to respective RGB picture elements of the liquid crystal panel, it is possible to irradiate the RGB picture elements with the respective beams of light emitted from the RGB light sources.

This makes it possible to carry out a full-color display without using color filters, and achieve an improvement in efficiency in the utilization of light by an amount corresponding to the amount otherwise absorbed by the color filters. Further, since the liquid crystal panel is irradiated with substantially parallel beams of light, it is possible to achieve (i) a reduction in a ratio of light to be shielded by BM (black matrix) between the picture elements, and (ii) an improvement in efficiency in the utilization of light by an amount corresponding to the amount thus reduced. Further, since the liquid crystal panel is irradiated with substantially parallel beams of light obtained by passing through the MLA2, it is possible to achieve a further improvement in a sense of resolution.

Further, since the substantially parallel beams of light obtained by passing through the MLA 2 pass through the liquid crystal panel, and then reach a diffusion plate as they are, the beams of respective RGB colors are diffused so as to have the same angular distribution. This prevents a viewer who views a liquid crystal display device from different directions from recognizing different colors depending on the directions. This allows an improvement in color reproducibility to be achieved. Further, even in a case where light sources, such as LED, which have significant individual differences, are used, it is possible to reduce luminance unevenness and color unevenness by averaging variations in individual-differences among light emitted from such light sources.

Embodiment 1 describes an example of the liquid crystal display device provided with the backlight system 30 illustrated in FIG. 1. The backlight system 30 is constituted by (i) a liquid crystal element provided on the MLA2, the liquid crystal element including an entrance-side glass substrate 33, an exit-side glass substrate 35, and a liquid crystal layer 34 sandwiched by the both glass substrates, (ii) a driving element (TFT) (not illustrated) which is provided between the liquid crystal element and the exit-side glass substrate 35 so as to drive the liquid crystal element, (iii) a polarizer 32 provided on the light-entrance surface of the entrance-side glass substrate 33, (iv) an analyzer 36 provided on the light-exit surface of the exit-side glass substrate 35, and (v) a diffusion plate 38 provided on the light-exit surface of the analyzer 36.

The reason why the diffusion plate 38 is provided will be explained. According to the liquid crystal display device 10 provided with the backlight system 30, beams of light emitted from the light sources are converged on picture elements. Namely, the beams of light, which have passed through the liquid crystal layer 34 and exited from the analyzer 36 are converged to the front (in a front direction of the liquid crystal panel) to some extent. It is therefore difficult for a viewer to view what is displayed on a screen of the liquid crystal display device 10 from an oblique direction due to shortage of light. The diffusion plate 38 is thus preferably provided in order to solve the problem.

Note however that, in the liquid crystal display device 10, the arrangement of the liquid crystal layer 34, the driving element, the glass substrates 33 and 35, the polarizer 32, the analyzer 36, and the diffusion plate 38 is not limited to the configuration illustrated in FIG. 1. Other arrangements will be described later.

What is important in Embodiment 1 is that the beams of RGB light pass through picture elements which correspond to respective colors (see FIG. 1). That is, R light passes through an R picture element, G light passes through a G picture element, and B light passes through a B picture element. In such a condition, the liquid crystal layer is driven by application of a voltage via the driving element across parts of the liquid crystal layer which parts correspond to the respective picture elements. Ideally, this makes it possible to carry out a full-color display without color filters.

In fact, however, there can be problems that, due to variations in manufacturing, for example (i) optical components cannot be manufactured nor assembled as designed, and (ii) there is no choice but to produce optical components somewhat different from designed ones in view of manufacturing cost. In such circumstances, it may be difficult to cause only corresponding beams of light to be converged onto picture elements corresponding to respective RGB colors. This may cause deterioration in display quality at worst. According to the present invention, in order to prevent such a worst case, a color filter layer can be provided.

A further improvement in display quality can be achieved by suppressing backscattering of outside light caused by the diffusion plate disposed on a display surface side. The diffusion plate has functions of (i) directing light from the liquid crystal panel side towards a viewer side as diffused light, while (ii) transmitting and diffusing part of light from the viewer side to the diffusion plate towards the liquid crystal panel side and reflecting and diffusing the other part of the light towards the viewer side. The reflection by the diffusion plate is referred to as backscattering of outside light. In a case where an image transmitted through a usual liquid crystal panel is viewed together with such reflected and diffused light, the image will have excess brightness. This causes deterioration in display quality.

In order to suppress such backscattering, there has been proposed a method in which circular polarization plates are provided above and below the diffusion plate. A circular polarization plate is a polarization plate obtained by combining a polarizer and a quarter wave plate. Specifically, a first polarizer, the entrance-side glass substrate 33, the driving element, the liquid crystal layer 34, the exit-side glass substrate 35, the analyzer 36, a first quarter wave plate, the diffusion plate 38, a second quarter wave plate, and a second polarizer are arranged in this order from a light emitting section 31 side. The first polarizer and the analyzer 36 have polarized light absorbing axes which are orthogonal to each other, and the analyzer 36 and the second polarizer have polarized light absorbing axes which are parallel to each other. Further, the first quarter wave plate and the second quarter wave plate are arranged such that their respective slow axes are orthogonal to each other. Furthermore, the polarized light absorbing axis of the analyzer 36 and the slow axis of the first quarter wave plate are arranged so as to be at an angle of 45° to each other.

The light sources constituting the light emitting section 31 of Embodiment 1 are a plurality of light sources for emitting beams of light at different dominant wavelengths from one another, and therefore the light emitting section 31 can be (i) any one type of LED (Light emitting diode) light sources, laser light sources, and organic EL (electroluminescence) light sources or (ii) a light emitting device including the light sources and a light guide. Note that the number of the light sources is not necessarily the same as that of types of the dominant wavelengths. Therefore, a plurality of light sources can be used for each type of the dominant wavelength. In view of averaging differences in property between products resulting from variations in manufacturing processes of the light sources, it is preferable to use a plurality of light sources for each type of the dominant wavelength. Note that examples of an LED light source include (i) an LED, such as a bullet type LED, in which a condenser lens (made from a spherical acrylic, for example) is provided on a light emitting surface (light emitting chip) and (ii) an LED, such as a mount type LED, which has no condenser lens. Any one of those can be employed.

Figure 4:
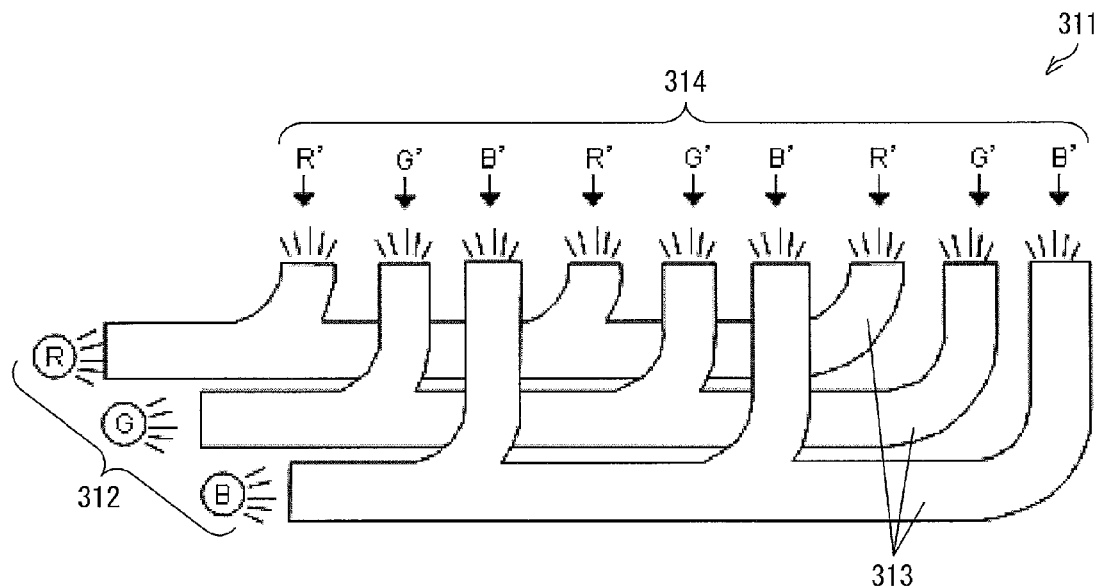
FIG. 4 is a cross-sectional view illustrating another configuration of a light emitting section of a liquid crystal display device in accordance with the present invention.

Accordingly, instead of the LED light sources illustrated in FIG. 1, a light emitting device including light sources and light guides as illustrated in FIG. 4 can be employed as the light sources of the light emitting section 31. Use of such a light emitting device brings about a great cost-down effect of reducing the number of light sources. The following description will discuss such a light emitting device in detail.

As shown in FIG. 4, a light emitting device 311 includes light sources 312 (an R light source, a G light source, and a B light source) and light guides 313, in which beams of light emitted from the light sources 312 are guided through the light guides 313 so as to exit from a plurality of exit sections (end sections), which are considered to be pseudo-light sources. For example, as shown in FIG. 4, beams of light from a group of the RGB light sources 312 are separately guided through three backlight units (light guides 313). The backlight units (light guides 313) form R', G', and B' pseudo-light sources 314, and beams of light from the R', G', and B' pseudo-light sources 314 are converged onto picture elements through the MLA1 and the MLA2. This can bring about the same effect as in a case where R, G, and B light sources of FIG. 1 are used.

Figure 5:
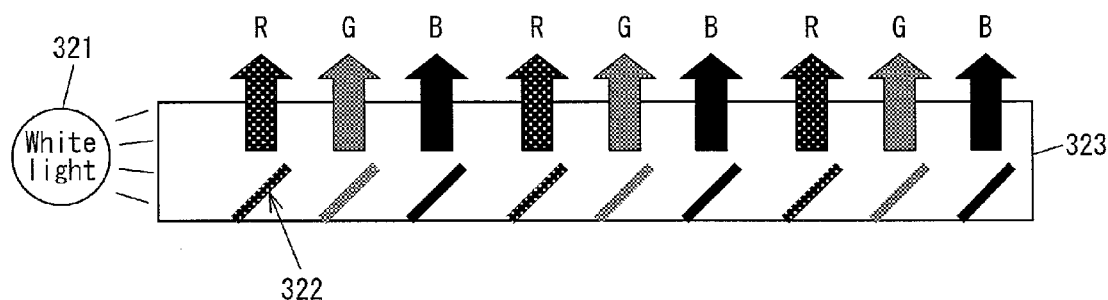
FIG. 5 is a cross-sectional view illustrating a further configuration of a light emitting section of a liquid crystal display device in accordance with the present invention.

Alternatively, a white light source can be employed as the light sources of the light emitting section 31. In a case where a white light source is employed, it is desirable that beams of RGB light be emitted so as to be different spatially or angularly from one another. Beams of RGB light spatially different from one another can be emitted by a light emitting device as illustrated in FIG. 5, the light emitting device employing a white light source 321 and a light guide 323 containing dichroic filters 322 for reflecting respective R, G and B light beams. A dichroic filter 322 is a filter that reflects only light of a certain wavelength range and transmits light of the other wavelength range. By spatially arranging such dichroic filters 322 which reflect the respective R, G and B light beams, it is possible to extract the R, G, and B light beams from respective different positions.

Figure 6:
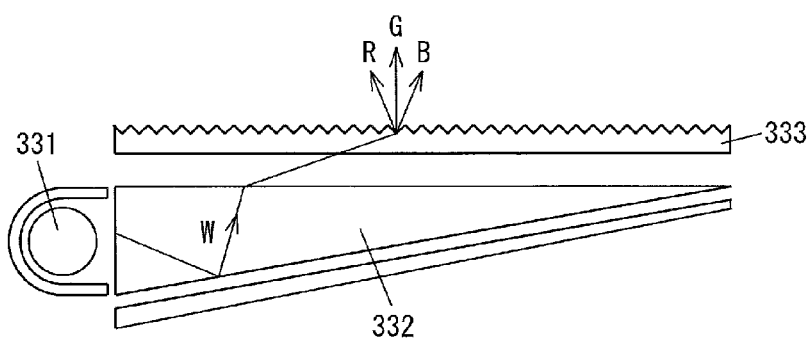
FIG. 6 is a cross-sectional view illustrating still a further configuration of a light emitting section of a liquid crystal display device in accordance with the present invention.

Further alternatively, as illustrated in FIG. 6, a white light source, a light guide, and a diffraction grating can be employed as the light sources of the light emitting section 31. According to this method, beams of light emitted from the white light source 331 are guided through the light guide 332 and then extracted from the light guide 332 as substantially parallel beams of white light with a uniform brightness over a screen. The parallel beams of white light enter the diffraction grating 333, and then are diffracted by the diffraction grating 333. Of the parallel beams diffracted by the diffraction grating 333, a first order diffracted beam exits the diffraction grating 333 in a direction substantially vertical to the diffraction grating 333. Note here that, since beams of light of different wavelengths have different angles of diffraction, the firsts-order diffraction light is separated into R, G, and B light beams.

The white light source 331 shown in FIG. 6 can be (i) a white LED (such as a combination of a blue LED+Y and G fluorescent lights or a combination of a blue LED+G and R fluorescent lights), (ii) a multi-color LED (an LED in which a plurality of diode chips that emit beams of light at different dominant wavelengths from one another are provided in a single LED) or (iii) a white organic EL.

Alternatively, a CCFL or an EEFL, which is a line light source and emits R, G and B light beams, can be employed as the light sources of the light emitting section 31.

Embodiment 2

The following description will discuss a liquid crystal display device and a backlight system provided therein, of Embodiment 2. For convenience of description, the same reference numerals are given to the members which are described in Embodiment 1 and have the same functions as those of the members of Embodiment 1, and their descriptions are omitted. Note that, unless otherwise noted, the terms defined in Embodiment 1 have the same definitions also in the present embodiment.

Since the basic configuration of the present embodiment is the same as that shown in FIG. 1 of Embodiment 1, the following description will address mainly the difference between the Embodiments 1 and 2. According to Embodiment 1, the MLA1 in the backlight system is arranged in accordance with certain conditional expressions which are based on the pitch at which pixels of the liquid crystal panel 37 are arrayed. In this case, beams of light emitted from LED light sources of the same color are converged by respective different lenses 1A onto focal points of lenses 2A of the MLA2. This allows variations in luminance or chromaticity due to individual differences in LED light sources to be reduced.

Note that the configuration of Embodiment 1 is most suitable, because LED light sources obtained by current manufacturing processes have significant variations in individual-differences. However, if LED light sources can be produced much equally in the future, the configuration of Embodiment 2 can also achieve in-plane uniformity required for a liquid crystal panel and the like.

Figure 7:
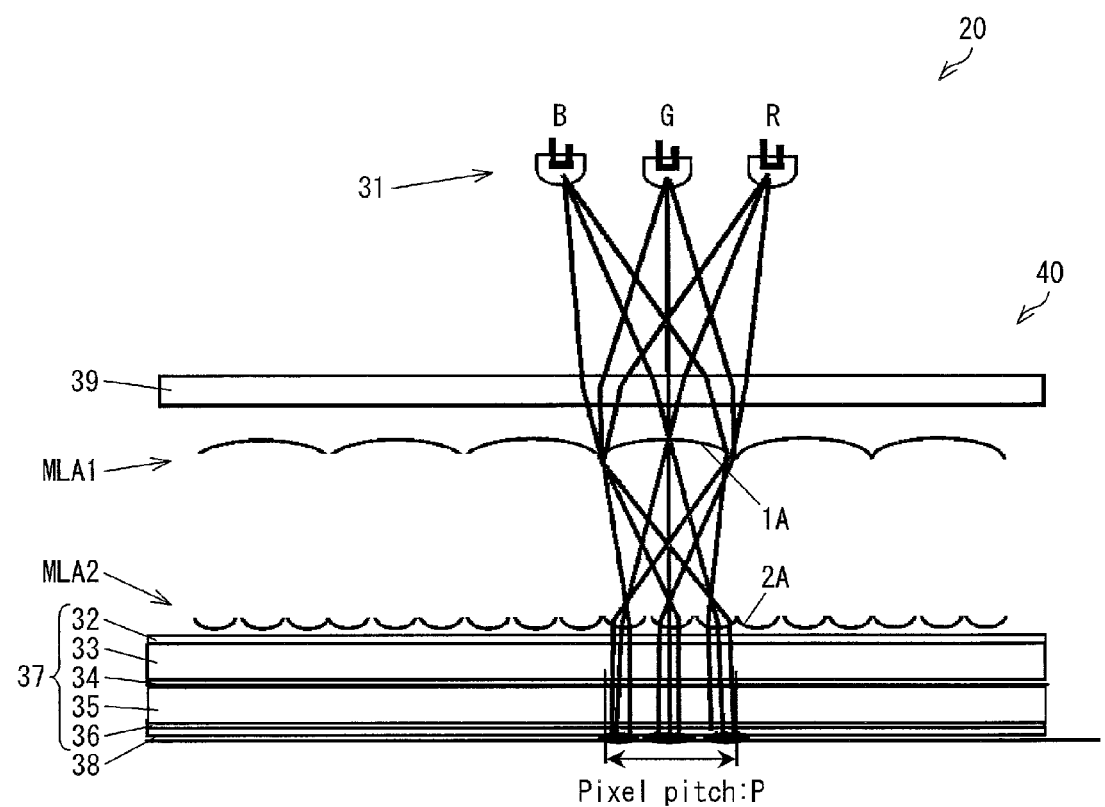
FIG. 7 is a cross-sectional view schematically illustrating a configuration of a liquid crystal display device in accordance with Embodiment 2.

FIG. 7 is a cross-sectional view schematically illustrating a configuration of a liquid crystal display device 20 of Embodiment 2. As illustrated in FIG. 7, the liquid crystal display device 20 includes a Fresnel lens 39 provided between the light emitting section 31 (LED light sources) and the MLA1. The Fresnel lens 39 is a lens in which step-like prisms having respective different refractive angles are formed concentrically. A G light source is provided at the focal point of the Fresnel lens 39, and B and R light sources are arranged on the both sides of the G light source. Since the G light source is provided at the focal point of the Fresnel lens 39, light emitted from the G light source passes through the Fresnel lens 39 and then is deflected into parallel beams of light. Further, beams of light emitted from the R and B light sources pass through the Fresnel lens 39 and then are deflected into parallel beams of light, which are at an angle different from that of the parallel beams of the G light source. Therefore, the beams of light emitted from the RGB light sources enter the MLA1 at respective different angles.

The beams of light, which have entered the MLA1 at different angles, will be converged onto respective positions spatially different from one another. That is, beams of light emitted from the respective RGB light sources can be converged onto respective different positions. After that, each of the R, G and B light beams is deflected by the MLA2 and converted into substantially parallel beams, so as to illuminate the liquid crystal panel 37. The description thereof is omitted here because it is the same as that of Embodiment 1.

Figure 8:
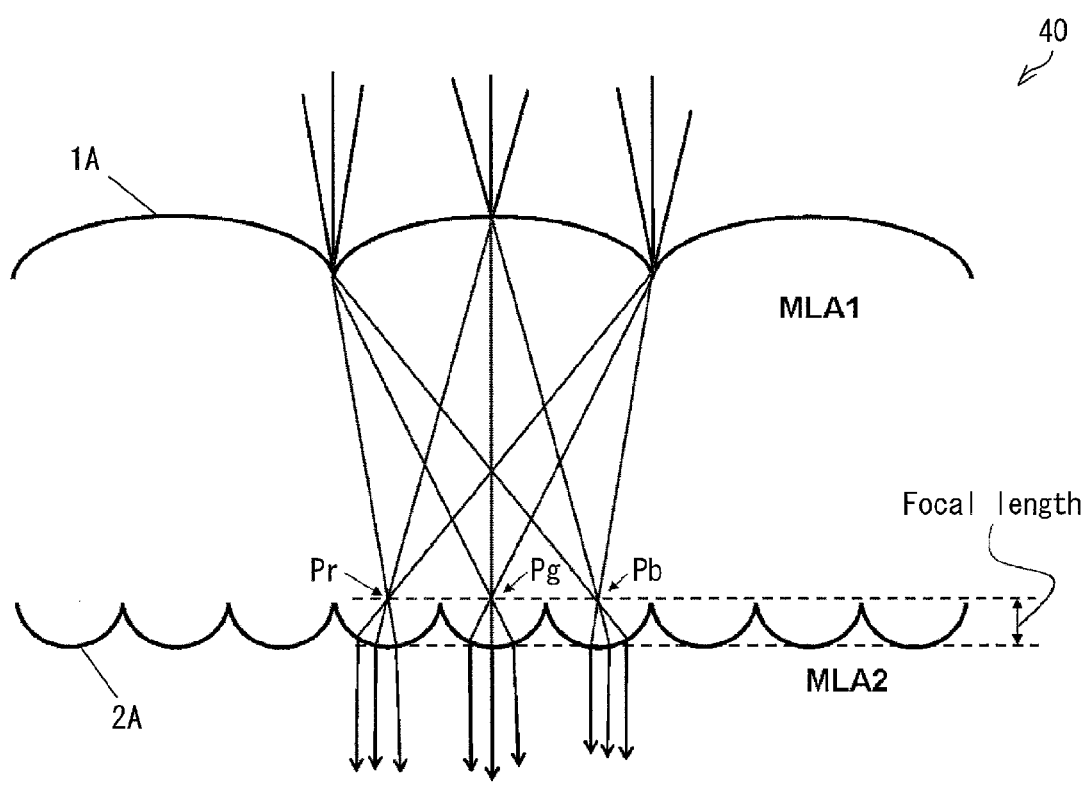
FIG. 8 is a cross-sectional view schematically illustrating a configuration of a backlight system in accordance with Embodiment 2.

The light emitting section 31 employs R, G, and B light sources as a plurality of light sources that emit beams of light of different colors. The R, G, and B light sources are arranged in this order from the right side to the left side of FIG. 7. When attention is directed to a single lens 1A of the MLA1, beams of light emitted from the respective RGB light sources have angle distributions as illustrated in FIG. 8. As is clear from FIG. 8, since chief rays of the beams of light emitted from the RGB light sources are at different angles, the beams of light having passed through the lens 1A are converged onto respective different positions. That is, the beams of light having been emitted from the R, G, and B light sources and passed through the lens surface of the lens 1A are converged onto respective positions Pr, Pg, and Pb. Note, however, that the respective RGB light beams have different angular distributions at the time of being converged onto the positions Pr, Pg, and Pb.

The MLA2 is arranged such that the positions Pr, Pg, and Pb are the focal points of lenses 2A of the MLA2. Embodiment 2 is characterized in that, due to the above arrangement, the beams of light, which have passed through the focal points (Pr, Pg, and Pb) are received by lenses 2A which correspond to the R, G and B light beams, so that all of the beams of light obtained by passing through the MLA2 are parallel beams. Note, however, that the beams of light cannot be converged only onto focal points of the MLA2 because the RGB light sources have in fact finite light-emitting points, and thus the beams of light are converged to form a point image constituted by finite points. Therefore, the beams of light obtained by passing through the MLA2 are not exactly parallel beams.

Note that the number of the lenses 2A of the MLA2 is three times as much as that of the lenses 1A of the MLA1.

Note here that, according to Embodiment 2, it is preferable that a plurality of light emitting sections 31 and a plurality of Fresnel lenses 39 are provided in order for the liquid crystal panel to be applicable to a local diming driving which aims at a low electric power consumption. In this case, the plurality of light emitting sections 31 are provided in one-to-one correspondence to the plurality of Fresnel lenses 39. Note that, in a case where beams of light emitted from a light emitting section 31 enter not only a corresponding Fresnel lens 39 but also an adjacent Fresnel lens 39, the beams of light will be emitted at a significantly different angle. This causes stray light. It is thus preferable to provide shielding means between adjacent Fresnel lenses 39. Providing such means can suppress occurrence of stray light, and thus makes it possible to prevent deterioration in display quality.

Alternatively, a configuration similar to Embodiment 2 can be employed, in which configuration the light source device shown in FIG. 6 is applied to the backlight system of FIG. 7. That is, the configuration includes the white light source 331 and the light guide 332 instead of the light emitting section 31, and further includes a light separating element such as the diffraction grating 333. This configuration enables the MLA1 to be irradiated with beams of light of different colors depending on angles. This can bring about the same effect as in a case where the light emitting section 31 and the Fresnel lens 39 are used.

As described in Embodiments 1 and 2, a liquid crystal display device of the present invention is configured such that light emitted from the R light source, light emitted from the G light source, and light emitted from the B light source (LEDs) each pass through the MLA2 and then are each converted into substantially parallel beams of light (which are substantially vertical to the display surface of the liquid crystal panel 37) at spatially different positions from one another, so as to illuminate the liquid crystal panel. Further, by providing the lenses 2A of the MLA2 in one-to-one correspondence to respective RGB picture elements of the liquid crystal panel, it is possible to irradiate the RGB picture elements of the liquid crystal panel with the respective beams of light emitted from the RGB light sources.

This makes it possible to carry out a full-color display without using color filters, and achieve an improvement in efficiency in the utilization of light by an amount corresponding to the amount otherwise absorbed by the color filters. Further, since the liquid crystal panel is irradiated with substantially parallel beams of light, it is possible to achieve (i) a reduction in a ratio of light to be shielded by BM (black matrix) between the picture elements, and (ii) an improvement in efficiency in the utilization of light by an amount corresponding to the amount thus reduced. Further, since the liquid crystal panel is irradiated with substantially parallel beams of light obtained by passing through the MLA2, it is possible to achieve a further improvement in a sense of resolution.

Further, since the substantially parallel beams of light pass through the liquid crystal panel and then reach a diffusion plate as they are, the beams of respective RGB colors are diffused so as to have the same angular distribution. This prevents a viewer who views a liquid crystal display device from different directions from recognizing different colors depending on the directions. This allows an improvement in color reproducibility to be achieved.

Note that in a case where an optical path is deflected by way of a surface shape of a lens, the optical path is deflected according to the Snell's law by using a difference in refractive index at the interface on the lens surface. On the other hand, in a case where an optical path is deflected by a refractive index distribution, the light is deflected by distributing refractive indices within the lens.

This means to give a gradient to refractive indices inside of the lens by causing refractive indices to vary from the center to the periphery of the lens so that light is deflected due to the gradient of refractive index. In a case where an optical path is deflected by refractive index distribution, the lens surface is even. Therefore, a polarizer or an optical film etc. can be directly adhered to the microlens array. This makes it easy to maintain spaces between the polarizer or optical film etc. and the lens array. That is, according to a backlight system of the present invention, the first microlens array (MLA1) and the second microlens array (MLA2) included in the imaging optical system are constituted by lenses each of which deflects an optical path by way of (i) a surface shape of the lens or (ii) refractive index distribution of the lens.

Figure 9:
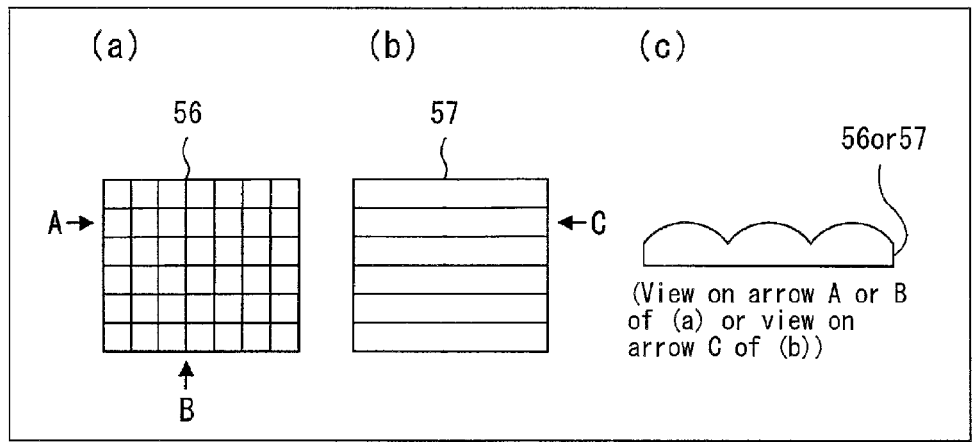
FIG. 9 illustrates examples of a configuration of each of microlens arrays (MLA1 and MLA2) included in an imaging optical system of the present invention.

For example, the microlens arrays (MLA1 and MLA2) included in the imaging optical system are preferably (i) fly-eye lenses 56 in each of which lenses are arrayed in two direction orthogonal to each other, (ii) lenticular lenses 57 in each of which micro cylindrical lenses are arrayed in one direction perpendicular to their longitudinal direction, or (iii) a fly-eye lens 56 and a lenticular lens 57 (for example, see FIG. 9). Since the first microlens array (MLA1) is constituted by a plurality of microlenses, it is possible to reduce the curvature of a surface shape as compared with a case where the MLA1 is constituted by a single microlens. This allows occurrence of stray light to be suppressed. The same apply to the second microlens array (MLA2).

It is preferable that lenses 1A and 2A which constitute the microlens arrays (MLA1 and MLA2), respectively, are shaped such that (i) lenses 1A each has a curvature radius of 0.5 mm to 2 mm, and (ii) lenses 2A each has a curvature radius of 0.05 mm to 0.2 mm. The curvature radius is determined in accordance with (i) a distance from the light emitting section 31 to the microlens surface, (ii) a distance from the microlens surface to the picture element, (iii) refractive indices of the microlens arrays, and (iv) on which area of the liquid crystal layer light is to be converged. It is thus necessary to use lenses whose surfaces each has a curvature most suitable for the sizes of light sources and a liquid crystal panel to be used, and required thickness of a backlight section. The lens has a convex surface in order to cause light to be converged. Alternatively, the lens can have a non-spherical surface instead of a spherical surface, in order to reduce aberration. Each of the lenses 1A and 2A can have one convex surface or two convex surfaces. Note however that, in a case where the lenses 1A and 2A have convex surfaces which face to each other, the MLA1 and the MLA2 cannot be bonded to each other with an adhesive agent or the like. Therefore, in such a case, it is necessary to hold the MLA1 and the MLA2 so that they are not displaced.

Note here that, in order to carry out an optimal spatial separation of light emitted from a plurality of light emitting sections, a plurality of light emitting sections are preferably arranged in the following manner.

(A) In a case where fly-eye lenses 56 only are used as microlens arrays, a plurality of light emitting sections are arranged in a direction orthogonal to any one of two crossed directions, i.e., vertical and lateral directions (directions A and B in (a) of FIG. 9) in which the microlenses are arrayed.

(B) In a case where, as microlens arrays, lenticular lenses 57 only are used or a lenticular lens 57 and a fly-eye lens 56 are used as microlens arrays, a plurality of light emitting sections are arranged in a direction orthogonal to the longitudinal direction of the micro cylindrical lenses (direction C in (b) of FIG. 9).

Note here that, for example in a case of displaying an image on an entire display screen in which image there is a great difference in luminance between a considerably wide region and the other region, division of the entire screen into a plurality of blocks makes it easier to control luminance and color. As an example of this embodiment, it is preferable to employ a configuration in which (i) the light emitting section (light source array) and the microlens arrays are divided into a plurality of blocks, and (ii) an optical axis of a light source is tilted so that beams of light emitted from a light source array in each block substantially equally enter microlens arrays in that block.

Figure 10:
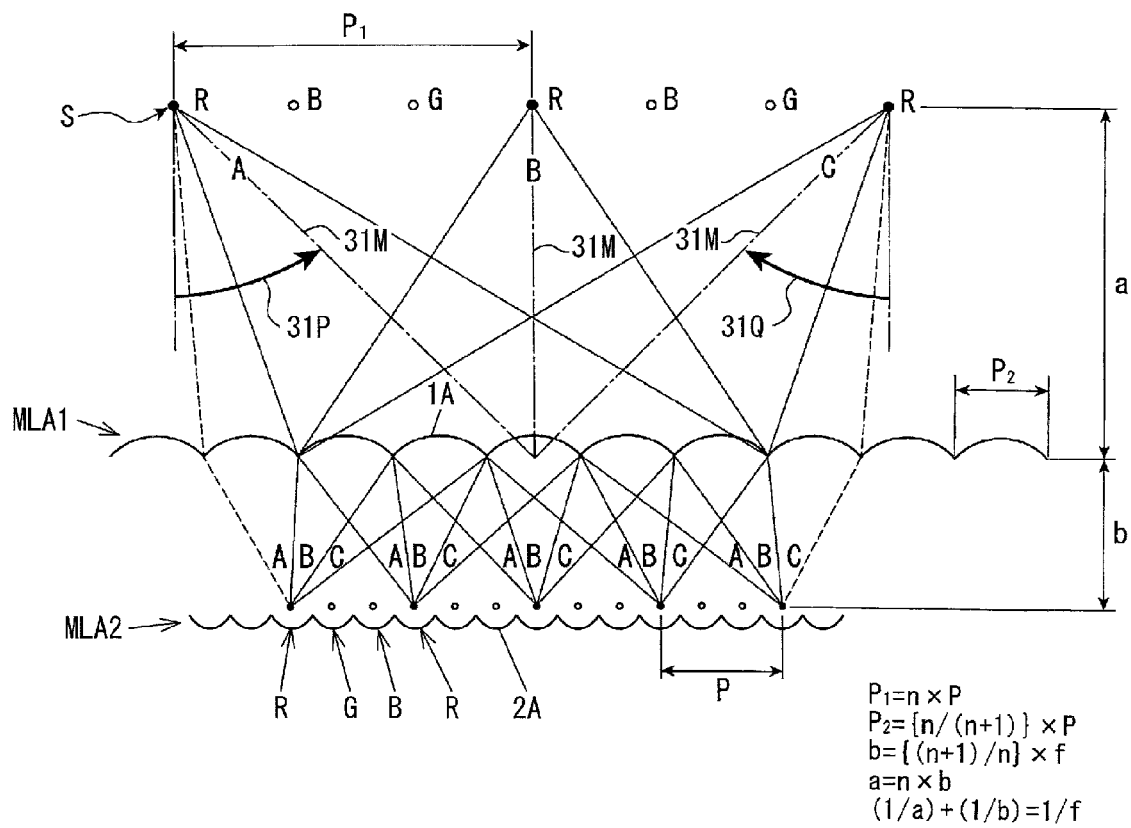
FIG. 10 is a cross-sectional view illustrating a backlight system of the present invention, in which optical axes of light sources of a light emitting section are tilted.

An example of this embodiment is shown in FIG. 10. FIG. 10 illustrates a state in which in order that beams of light emitted from three R light sources (A, B, C) within the same block substantially equally enter a microlens array (lenses 1A) in the block, the two R light sources (A, C) at both sides have their optical axes 31M pivoted on their respective effective light emitting points S in the direction of arrows 31P and 31Q. The same applies to the G light sources and the B light sources.

Meanwhile, according to backlight systems which have been described, a distance from the light emitting section 31 to the picture elements is increased proportionally as the area of a region that is irradiated by one backlight system is increased. Conversely, it is possible to reduce the thickness of a backlight system by reducing the area of a region that is irradiated by one backlight system and irradiating one liquid crystal panel with a plurality of backlight systems. This allows slimming-down of the backlight system.

Figure 11:
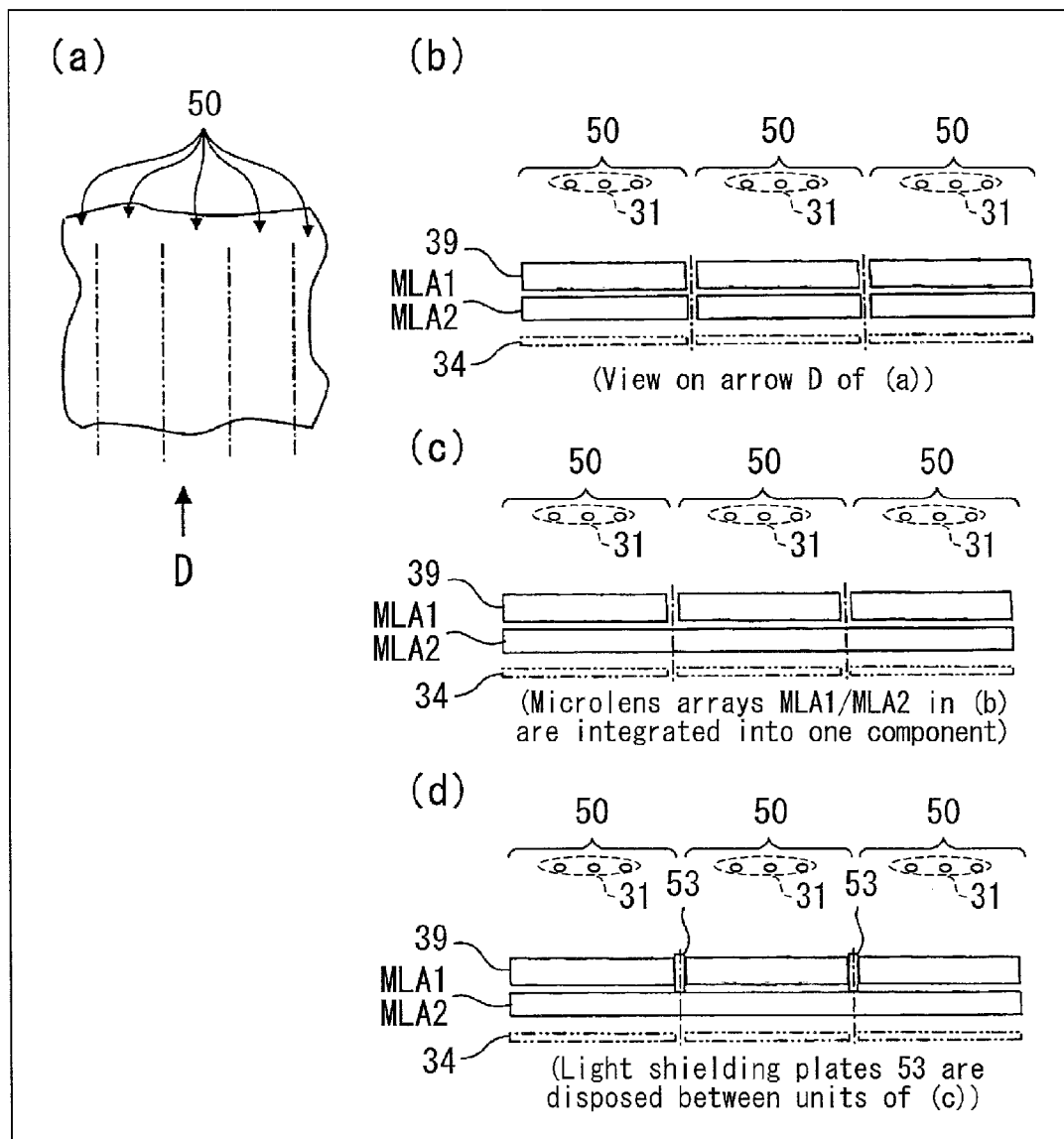
FIG. 11 is a cross-sectional view illustrating a state in which backlight units of the present invention are arranged in parallel to each other (complex backlight system).
Figure 12:
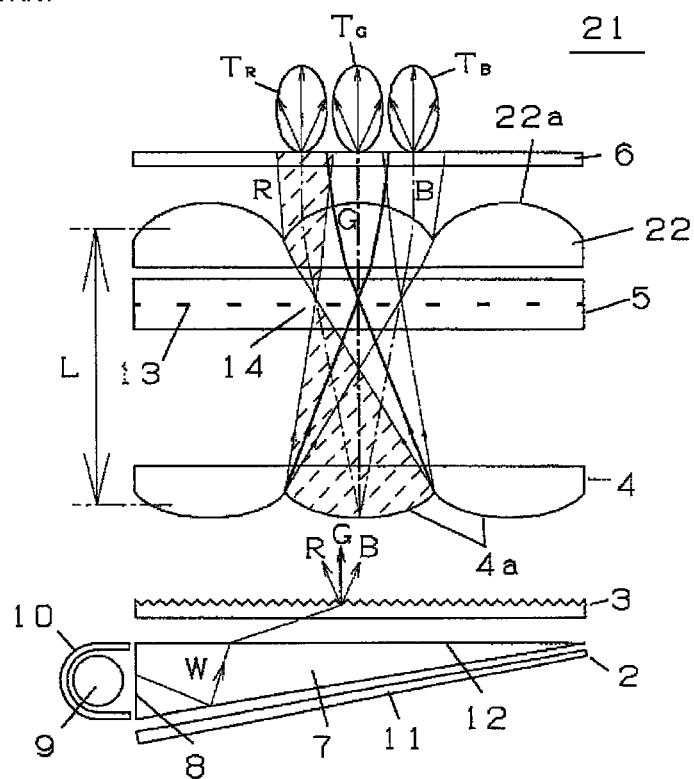
FIG. 12 is a cross-sectional view schematically illustrating a configuration of a conventional image display device.

This is achieved by using a backlight system as a single backlight unit 50 and arranging a plurality of such backlight units 50 in parallel with each other (complex backlight system) (for example, see FIG. 11). Note, however, that an increase in the number of backlight units that are used for one liquid crystal panel leads to an increase in the number of components. This causes a rise in manufacturing cost. Therefore, there is a trade-off between manufacturing cost and slimming-down of the backlight system.

Further, the backlight system of the present invention preferably includes means (not illustrated) for controlling the amount of light from the light sources for each one of or for every two or more of the plurality of backlight units. The means is configured to easily change brightness in each of different places within one liquid crystal panel. The means makes it possible, for example in a case of displaying an image in which the moon shines in the night sky (i.e., part of the image is brightly displayed and the other part of the image is darkly displayed), to reduce the amount of light from the backlight unit which corresponds to the darkly displayed part. This significantly contributes to a reduction in electric power consumption.

Further, in an embodiment in which a plurality of backlight units are arranged in parallel with each other, it is preferable, for the purpose of reducing manufacturing costs and dispensing with an alignment step, that the plurality of backlight units share an integrated optical component constituting the backlight system. For example, at least one type of the microlens arrays (MLA1 and MLA2) and Fresnel lens 39 included in the imaging optical system is preferably an integrated optical component shared by a plurality of units, instead of being separately provided to the plurality of units. (c) of FIG. 11 illustrates a case where a plurality of backlight units 50 share an integrated optical component (MLA1 and MLA2).

Ideally, the backlight system illustrated in FIG. 11 is configured such that the integrated optical component is as large as the liquid crystal panel. However, in actual manufacturing, the backlight system can employ a configuration that seems best suited thereto in consideration of manufacturing costs, the number of part-assembling steps, and the like.

Further, according to the backlight system illustrated in FIG. 11, the following problem may occur. For example, consider a configuration including a Fresnel lens 39. In a case where light (for example, R light) emitted from a light source of one (assuming a unit U1) of a plurality of backlight units 50 enters a Fresnel lens 39 of an adjacent backlight unit 50 (assuming a unit U2) and reflected by the Fresnel lens 39, the light significantly deviates from the direction of the substantially parallel beams of light (i.e., a direction in which light which has entered the Fresnel lens 39 of the unit U2 are to be deflected by the Fresnel lens 39). This causes stray light, and ultimately light of a different dominant wavelength (for example, the G light or B light) to reach a picture element. This results in deterioration in display quality.

In order to solve such a problem, for example as illustrated in (d) of FIG. 11, it is preferable to provide, between backlight units 50 which are adjacent to each other, means (light shielding plate) 53 for preventing light from a light source 31 of any one of the backlight units 50 from entering another backlight unit.

As illustrated in FIGS. 1 and 7, a liquid crystal display device including a backlight system of the present invention has a configuration in which a polarizer 32, an entrance-side glass substrate 33, a liquid crystal layer 34, a driving element, an exit-side glass substrate 35, an analyzer 36 and a diffusion plate 38 are stacked in this order from a light entrance side. Accordingly, the light emitted from the light emitting section 31 passes through the MLA1 and the MLA2, the polarizer 32, and the entrance-side glass substrate 33, and is converged onto picture elements of the liquid crystal layer 34. Then, the light passes through the exit-side glass substrate 35 and the analyzer 36, and is diffused by the diffusion plate 38 and exits outwards. The driving element is provided in the boundary between pixels of the liquid crystal layer 34. Therefore, the driving element does not affect the light which passes through the pixels.

Alternatively, the liquid crystal display device illustrated in FIGS. 1 and 7 can have a configuration in which the liquid crystal layer 34, the polarizer 32 and the entrance-side glass substrate 33 are stacked in this order from the liquid crystal layer 34 towards the light entrance side, instead of the order of the liquid crystal layer 34, the entrance-side glass substrate 33 and the polarizer 32. By providing the polarizer 32 between the liquid crystal layer 34 and the entrance-side glass substrate 33 like above, it is possible to form the MLA2 directly on the entrance-side glass substrate 33. This allows alignment of the MLA2 and the liquid crystal layer 34 to be maintained highly precisely. The configuration also enables light converged by the MLA2 to pass through the liquid crystal layer 34 while maintaining high polarization characteristics. This effectively prevents deterioration in display quality.

Alternatively, the liquid crystal display device illustrated in FIGS. 1 and 7 can have a configuration in which the liquid crystal layer 34, the driving element, the analyzer 36, the exit-side glass substrate 35 and the diffusion plate 38 are stacked in this order from the liquid crystal layer 34 towards a light exit side, instead of the order of the liquid crystal layer 34, the driving element, the exit-side glass substrate 35, the analyzer 36 and the diffusion plate 38. By providing the analyzer 36 between the exit-side glass substrate 35 and the liquid crystal layer 34 like above, it is possible to cause the analyzer 36 to be contained in the liquid crystal panel while producing the liquid crystal panel. This allows dispensing with a combining step of the liquid crystal panel and the analyzer.

Further, according to the configuration of the liquid crystal display device illustrated in FIGS. 1 and 7, the exit-side glass substrate 35 is provided between the liquid crystal layer 34 and the analyzer 36. This may cause beams of light, which have passed through adjacent picture elements, to overlap each other when they reach the analyzer 36, depending on the thickness of the exit-side glass substrate 35. If the beams of light overlapping each other are diffused by the diffusion plate 38, deterioration in display quality may be caused.

In order to prevent such deterioration, the liquid crystal display device illustrated in FIGS. 1 and 7 preferably has a configuration in which the liquid crystal layer 34, the driving element, the analyzer 36, the diffusion plate 38, and the exit-side glass substrate 35 are stacked in this order from the liquid crystal layer 34 towards the light exit side, instead of the order of the liquid crystal layer 34, the driving element, the exit-side glass substrate 35, the analyzer 36 and the diffusion plate 38.

Further, in a case where the diffusion plate 38 is a polarization-holding diffusion plate (for example, an element which carries out diffusion by means of total reflection at a boundary of internal refractive indices), the liquid crystal display device can further include such a diffusion plate between the driving element and the exit-side glass substrate 35.

Alternatively, the liquid crystal layer 34, the driving element, the polarization-holding diffusion plate, the analyzer 36 and the exit-side glass substrate 35 can be stacked in this order or the liquid crystal layer 34, the driving element, the exit-side glass substrate 35, the polarization-holding diffusion plate and the analyzer 36 can be stacked in this order from the liquid crystal layer 34 towards the light exit side, instead of the order of the liquid crystal layer 34, the driving element, the polarization-holding diffusion plate, the exit-side glass substrate 35 and the analyzer 36.

Further, it is more preferable that the diffusion plate 38 and the polarization-holding diffusion plate have an incidence-angle-independent diffusion characteristic (a characteristic in which diffusion intensity distributions when light is transmitted through a diffusion plate are constant independently of an incidence angle of the light entering the diffusion plate). This is because beams of light, which have passed through the picture elements into which liquid crystal display pixels are spatially divided by color, have the same diffusion characteristic, and display quality is expected to be improved.

Alternatively, the liquid crystal display device can be configured such that the polarizer 32 is provided between the first microlens array (MLA1) and the second microlens array (MLA2) in the imaging optical system of the backlight system. According to the configuration, it is possible to produce the MLA2 during a liquid crystal element manufacturing process which includes an alignment step for aligning the MLA2 with the liquid crystal element. This brings about an advantage of dispensing with an alignment step for aligning the MLA2 with the manufactured liquid crystal display device (liquid crystal panel), the alignment step being required in a case where the imaging optical system is manufactured separately from the liquid crystal element.

Alternatively, the liquid crystal display device can be configured such that the imaging optical system of the backlight system is provided between the polarizer 32 and the entrance-side glass substrate 33. According to the configuration, it is possible to produce the imaging optical system in a liquid crystal element manufacturing process which includes an alignment step for aligning the imaging optical system with the liquid crystal element. This brings about an advantage of dispensing with an alignment step for aligning the imaging optical system with the manufactured liquid crystal display device (liquid crystal panel), the alignment step being required in a case where the imaging optical system is manufactured separately from the liquid crystal element.

According to the configuration, the first lens array can be produced directly on a protection film of the polarizer. This allows the number of the optical components to be reduced.

The following description will discuss the step of forming a fly-eye lens 56 on a glass substrate, the step being included in a method for manufacturing a liquid crystal display device having such a configuration.

First, ultraviolet cure resin is applied to a glass substrate by a spin coating or dipping method. Next, light shielding masks are arranged in a virtual plane which faces parallel at a predetermined distance a surface of the glass substrate to which surface the resin is applied. It is preferable to arrange the light shielding masks such that places where lenses of the fly-eye lens 56 are to be formed are irradiated with ultraviolet through openings. It is further preferable to arrange the light shielding masks between a light source for exposure and the glass substrate. In such an arrangement, the light source for exposure emits ultraviolet to the light shielding masks so that part of the ultraviolet cure resin applied to the glass substrate is exposed. Then, the ultraviolet-curing resin which has not been exposed is developed and removed. In this way, the fly-eye lens 56 is formed.

Note that, instead of the fly-eye lens 56, a lenticular lens 57 can be employed. The same process can be applied to a case where the lenticular lens 57 is to be formed.

It is preferable to use an ultraviolet cure resin which does not change polarization conditions. The reason will be described below. Since the ultraviolet cure resin is formed on the glass substrate, the imaging optical system will be formed between the polarizer and the analyzer. In a case where the polarization conditions of the imaging optical system are changed, deterioration in display quality will be caused.

Note that, according to a liquid crystal display device of the present invention, the liquid crystal layer 34 and the drive element can have their places swapped. This does not adversely affect the display property of the liquid crystal display device. Accordingly, the scope of the present invention encompasses a liquid crystal display device in which the liquid crystal element and the driving element have their places swapped.

As has been described, a backlight system of the present invention is a backlight system including: a light-emitting section for emitting beams of light at different dominant wavelengths from one another; and an imaging optical system for causing the beams of light emitted from the light emitting section to be converged, said backlight system irradiating a liquid crystal panel with the beams of light, which have passed through the imaging optical system, the liquid crystal panel including a plurality of pixels arrayed at a predetermined pitch, each of the pixels being configured to include a plurality of picture elements corresponding to respective colors, the imaging optical system including a first lens array and a second lens array, wherein the first lens array is an array of first lenses arrayed at a predetermined pitch and the second lens array is an array of second lenses arrayed at a predetermined pitch, the first lenses (i) separating, by color, the beams of light emitted from the light emitting section, and (ii) causing the separated beams of light to be converged at a pitch same as a pitch at which the picture elements are arrayed, the second lenses being (i) provided in one-to-one correspondence to the picture elements, and (ii) arranged such that the second lenses have their respective focal points at positions onto which the beams of light which have passed through the first lenses are converged, the second lenses deflecting the beams of light, which have passed through the first lenses, in substantially parallel directions (in a substantially vertical direction with respect to the display surface of the liquid crystal panel 37) so that the liquid crystal panel is irradiated with the deflected light.

Alternatively, the backlight system of the present invention can also be described as below.

That is, a backlight system of the present invention is a backlight system including: a light-emitting section for emitting beams of light at different dominant wavelengths from one another; and an imaging optical system for causing the beams of light emitted from the light emitting section to be converged onto picture elements into which each of a plurality of pixels arranged on a surface of a pixel array at a predetermined pitch is spatially divided according to color, the imaging optical system including a first lens array and a second lens array, wherein the first lens array (i) separates, by color, the beams of light emitted from the light emitting section, and (ii) causes the separated beams of light emitted from the light emitting section to be converged at the same pitch as a pitch at which the picture elements corresponding to the same color are arrayed; and the second lens array deflects the beams of light which have passed through the first lens array in substantially parallel directions, the number of the second lens array to be arrayed being the same as that of the picture elements arranged on the surface of the pixel array, and the second lens array being arranged so as to have their respective focal points at positions onto which the beams of light which have passed through the first lenses are converged.

The present invention is not limited to the embodiments, and can therefore be modified in many ways within the scope of Claims. The technical scope of the present invention encompasses embodiments obtained by combining the technical means appropriately modified within the scope of Claims.

INDUSTRIAL APPLICABILITY

The present invention is applicable to for example a liquid crystal display device including a backlight.

REFERENCE SIGNS LIST 10, 20 Liquid crystal display device
30, 40 Backlight system
31 Light emitting section (Light source array)
32 Polarizer
33 Entrance-side glass substrate
34 Liquid crystal layer
35 Exit-side glass substrate
36 Analyzer
37 Liquid crystal panel
38 Diffusion plate
39 Fresnel lens
MLA1 First microlens array
MLA2 Second microlens array
1A Lens (First microlens)
2A Lens (Second microlens)
50 Backlight unit
56 Fly-eye lens
57 Lenticular lens

The invention claimed is:

1. A backlight system comprising:
a light-emitting section for emitting beams of light at different dominant wavelengths from one another; and
an imaging optical system for causing the beams of light emitted from the light emitting section to be converged,
said backlight system irradiating a liquid crystal panel with the beams of light, which have passed through the imaging optical system,
the liquid crystal panel including a plurality of pixels arrayed at a predetermined pitch, each of the pixels being configured to include a plurality of picture elements corresponding to respective colors,
the imaging optical system including a first lens array and a second lens array, wherein the first lens array is an array of first lenses arrayed at a predetermined pitch and the second lens array is an array of second lenses arrayed at a predetermined pitch,
the first lenses (i) separating, by color, the beams of light emitted from the light emitting section, and (ii) causing the separated beams of light to be converged at a pitch same as a pitch at which the picture elements are arrayed,
the second lenses being (i) provided in one-to-one correspondence to the picture elements, and (ii) arranged such that the second lenses have their respective focal points at positions onto which the beams of light which have passed through the first lenses are converged,
the second lenses deflecting the beams of light, which have passed through the first lenses, in a substantially vertical direction with respect to a display surface of the liquid crystal panel so that the liquid crystal panel is irradiated with the deflected light.

2. The backlight system as set forth in claim 1, wherein:
on the assumption that the pitch at which the pixels are arrayed is denoted as P and the imaging optical system has an imaging magnification of (1/n),
the light emitting section has a pitch $P_1$ given as $P_1 = n \times P$, and the first lenses are arrayed at a pitch $P_2$ given as $P_2 = (n/(n+1)) \times P$.

3. The backlight system as set forth in claim 1, wherein:
the imaging optical system includes a Fresnel lens.

4. The backlight system as set forth in claim 1, wherein:
the first and the second lens arrays of the imaging optical system are arrays of lenses each of which deflects an optical path by way of (i) a surface shape of the lens or (ii) a refractive index distribution within the lens.

5. The backlight system as set forth in claim 4, wherein:
the first and the second lens arrays of the imaging optical system include (i) fly-eye lenses, (ii) lenticular lenses, or (iii) a fly-eye lens and a lenticular lens.

6. The backlight system as set forth in claim 1, wherein:
the light emitting section is made up of (i) any one type of a LED light source, a laser light source, and an organic EL light source or (ii) a light emitting device including the light source and a light guide.

7. The backlight system as set forth in claim 1, wherein:
the light emitting section and the imaging optical system are divided into a plurality of blocks; and
a light source included in the light emitting section has its optical axis rotated so that beams of light emitted from each of the blocks of the light emitting section substantially equally enter said each of the blocks of the imaging optical system.

8. A composite backlight system comprising a plurality of backlight units arranged in parallel with each other, each of the plurality of backlight units being a backlight system recited in claim 1.

9. The composite backlight system as set forth in claim 8, wherein:
at least one type of the imaging optical systems of the plurality of backlight units is an integrated component corresponding to two or more of the plurality of backlight units.

10. A liquid crystal display device including a backlight system as recited in claim 1, said liquid crystal display device comprising:
a liquid crystal element including a liquid crystal layer and entrance-side and exit-side glass substrates disposed on light entrance and exit sides, respectively, so that the liquid crystal layer is sandwiched therebetween;
a polarizer disposed on the entrance-side glass substrate of the liquid crystal element;
an analyzer disposed on the exit-side glass substrate of the liquid crystal element; and
a diffusion element disposed on an exit surface of the analyzer,
the liquid crystal element, the polarizer, the analyzer, and the diffusion element being disposed on a light exit side of the second lens array.

11. The liquid crystal display device as set forth in claim 10, wherein:
the liquid crystal layer, the exit-side glass substrate, the analyzer, and the diffusion element are stacked in this order from the liquid crystal layer toward the light exit side.

12. A liquid crystal display device as set forth in claim 10, wherein:
the diffusion element is a polarization-holding diffusion element.

13. The liquid crystal display device as set forth in claim 10, wherein:
the diffusion element further has an incidence-angle-independent diffusion characteristic.

* * * * *